United States Patent [19]
Ichikawa et al.

[11] Patent Number: 5,745,977
[45] Date of Patent: May 5, 1998

[54] METHOD OF MANUFACTURING ROTARY ELECTRIC MACHINE

[75] Inventors: Hideki Ichikawa, Inazawa; Ryohei Saji, Okazaki, both of Japan

[73] Assignee: Nippondenso Co., Ltd., Kariya, Japan

[21] Appl. No.: 610,065

[22] Filed: Feb. 29, 1996

[30] Foreign Application Priority Data

Mar. 27, 1995 [JP] Japan ................. 7-068234
Dec. 18, 1995 [JP] Japan ................. 7-329327

[51] Int. Cl.$^6$ ........................... H02K 15/04
[52] U.S. Cl. ............... 29/598; 228/200; 310/42; 310/45
[58] Field of Search ................ 29/598; 310/200, 310/201, 42, 45; 228/200

[56] References Cited

U.S. PATENT DOCUMENTS 5,508,577  4/1996  Shiga et al. ................. 310/201

FOREIGN PATENT DOCUMENTS 63-194541  8/1988  Japan.

Primary Examiner—Carl E. Hall
Attorney, Agent, or Firm—Cushman, Darby & Cushman IP Group of Pillsbury Madison & Sutro LLP

[57] ABSTRACT

An armature core composed of a plurality of thin plates having a plurality of slots and a center hole is provided. Then, lower coil bars and subsequently upper coil bars are placed in the respective slots with insulators so that a coil end portion of one of the lower coil bars in one of the slots and a coil end portion of one of the upper coil bars in another slot meet together. After the meeting-coil-end portions are welded, a shaft is inserted to the center hole.

8 Claims, 6 Drawing Sheets

1

METHOD OF MANUFACTURING ROTARY ELECTRIC MACHINE

CROSS REFERENCE TO RELATED APPLICATION

The present application is based on and claims priority from Japanese Patent Applications Hei 7-68234 filed on Mar. 27, 1995 and Hei 7-329327 filed on Dec. 18, 1995, the contents of which are incorporated herein by reference.

BACKGROUND OF THE INVENTION

1. Field of the Invention

The present invention relates to a method of manufacturing an electric rotary machine such as a starter motor for a vehicle.

2. Description of Related Art

A rotor of a small DC motor is usually manufactured through steps of manufacturing a shaft and an armature core, molding commutator, winding armature coils on the armature core, press-fitting the commutator to the shaft and connecting the armature coils with the commutator.

Japanese Patent Unexamined Publication Sho 63-194541 discloses a commutator having a plurality of commutator segments which have slanted inner portions molded in an insulating mold cylinder and outer portions forming a surface to be in contact with brushes. A riser is formed from tips of the respective inner and outer portions of the commutator segments thereby to eliminate swelling of the coil ends of the armature coils.

The riser of the above conventional commutator, however, has considerably large diameter and, therefore, is subjected to considerably large centrifugal force. As a result, the insulating mold cylinder cannot support the riser if the motor runs at a high speed because of a fold-back structure of the segment. Since the heat path of heat caused by friction of the segment with the brushes from the brush-contact surface to the riser is considerably long, temperature becomes so high as to damage the cylindrical mold.

SUMMARY OF THE INVENTION

The present invention is made in view of the above problems, and a primary object of the present invention is to provide a method of manufacturing rotary electric machine which can be used as a high power and high speed machine.

Another object of the present invention is to provide an improved method of manufacturing a rotary electric machine in which a shaft is press-fitted to an armature core after armature coils are installed into the armature core and welded.

Since the shaft is not inserted into the armature core when the connection is carried out, sufficient cooling of the welded portions can be ensured with high productivity.

Another object of the present invention is to provide a method of manufacturing a rotary electric machine comprising steps of providing a cylindrical armature core having number of slots and a center opening, providing lower coil bars each of which has a straight portion and coil-end portions radially extending from opposite ends of the straight portion, providing upper coil bars each of which has a straight portion and coil-end portions radially extending from opposite ends of the straight portion, inserting the straight portions of the lower and upper coil bars into respective slots with insulators, connecting each tip portion of the coil-end of the upper coil bar in each slot to each corresponding tip portion of the coil-end of the lower coil bars in a corresponding shifted slot to form a one-turn armature coil, and press-fitting a shaft into the center opening of the armature core.

A further object of the present invention is to provide a method of manufacturing a rotary electric machine, wherein above the connecting step comprises steps of rotatably holding inside surfaces of the tip portions of the lower coil bars at a central portion of the armature core by a cooling member, placing a welding torch near a pair of the tip portions of the lower and upper coil bars to be connected, grounding the coil bars having the tip portions to be connected, welding the tip portions to be connected, rotating the armature core by a set angle to place another pair of tip portions to be connected near the torch, and repeating the steps of grounding, welding and rotating until all the tip portions are connected.

As a result, the welding step is carried out in a short time.

A further object of the present invention is to provide a method of manufacturing a rotary electric machine, wherein the above cooling member maintains cooling temperature by circulating cooling liquid therein. Thus, a sufficient and uniform cooling of the coil bars is thereby ensured.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Preferred embodiments will be described with reference to appended drawings hereafter.

(First Embodiment)

Figure 1:
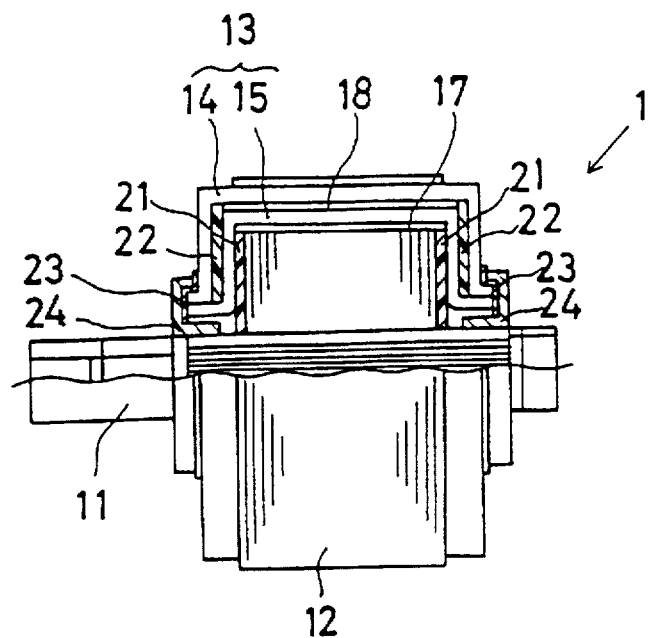
FIG. 1 is a cross-sectional side view illustrating a rotary electric machine manufactured according to the present invention.

A rotor 1 of a DC motor has a rotary shaft 11, an armature core 12, armature coils 13 composed of upper coil bars 14 and lower coil bars 15, and insulating plates 21, 22 and 23 as shown in FIG. 1. The armature core 12 is composed of a pile of plates which are stamped out of a thin steel plate by a press machine.

Figure 2:
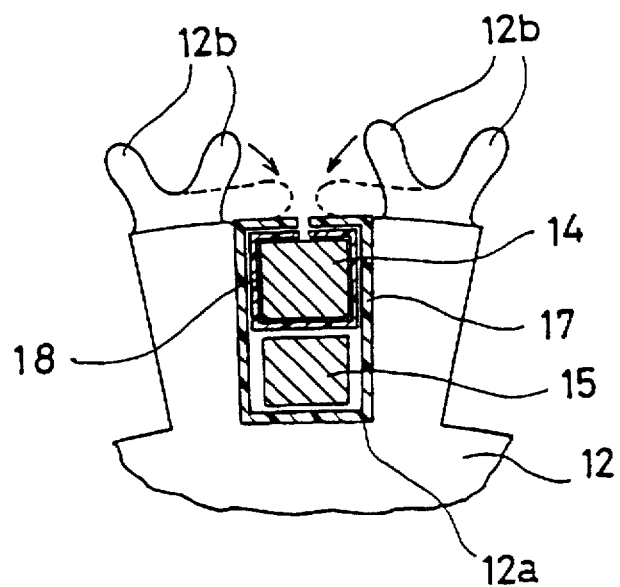
FIG. 2 is a cross-sectional front view illustrating a portion of an armature of the rotary electric machine illustrated in FIG. 1.

A plurality of axially extending slots 12a are formed in a peripheral portion of the armature core 12 to accommodate the armature coil 13 composed of the upper and lower coil bars 14 and 15 therein, and Y-shaped tooth tips 12b are formed on teeth which are formed on both sides of each one of the slots 12a as shown in FIG. 2. The Y-shaped tooth tips are bent after the armature coil 13 is put into the slots in order to hold the coil 13 in the slots 12a as well as to introduce magnetic flux to the armature core 12.

Figure 3A:
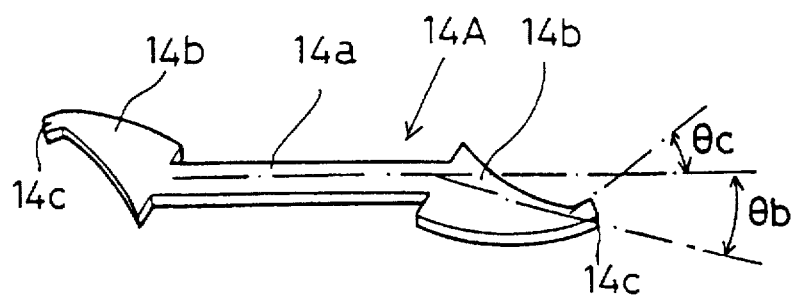
FIG. 3A is a perspective view illustrating a flat coil conductor before formation.
Figure 3B:
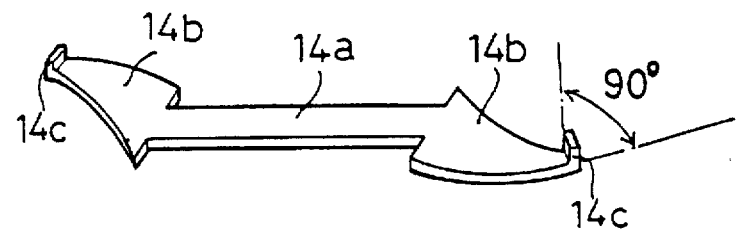
FIG. 3B is a perspective view illustrating the coil bar in a part of formation.
Figure 3C:
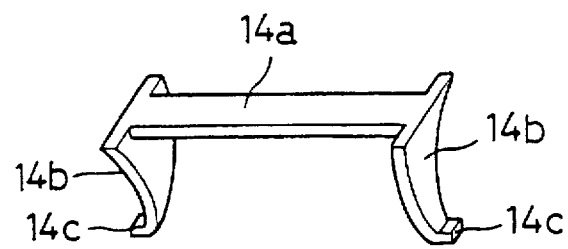
FIG. 3C is a perspective view illustrating the coil bar after formation.

FIGS. 3A, 3B and 3C show how the upper bar 14 is formed: a flat conductor piece 14A for the upper coil bar is stamped out of a copper plate, which is 1 mm thick or more, to form a straight portion 14a, slanted coil-end portions 14b extending from the straight portion 14a in opposite directions to opposite sides at an angle of θb to the straight portion and tip portions 14c extending from the coil-end portion at an angle of θc thereto in opposite directions as shown in FIG. 3A; the tip portions 14c are bent by about 90° in the same direction as shown in FIG. 3B; and the coil-end portions 14b are bent by about 90° into a U-shape as shown in FIG. 3C.

The lower coil bars 15 are formed in substantially the same manner and, therefore, the description of the lower coil bar 15 is omitted.

The straight portions 14a and 15a (not shown), the slanted coil-end portions 14b and 15b (not shown) and tip portions 14c and 15c (shown in FIG. 7) can be made separately and connected together to form the U-shaped coil bar shown in FIG. 3C.

Figure 4:
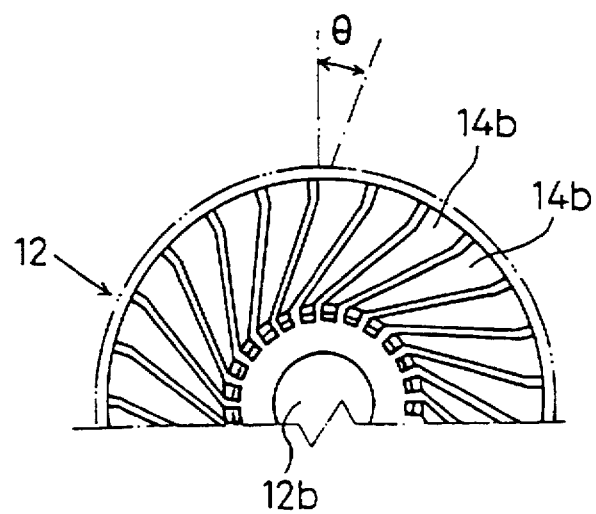
FIG. 4 is a schematic front view illustrating the armature of the rotary electric machine illustrated in FIG. 1 in process of manufacturing.

When the straight portion 14a is put into one of the slots 12a, the coil-end portions 14b extend from the slot on opposite end-surfaces of the armature core at an angle θ to a line drawn from the same slot in a radial direction. As a result, the coil-end portions 14b of the upper coil bars 14 disposed on one side of the armature core form a surface type commutator as shown in FIG. 4. The angle θ of the lower coil-end portions 15b is different from that of the upper coil-end portions 14b.

Figure 5:
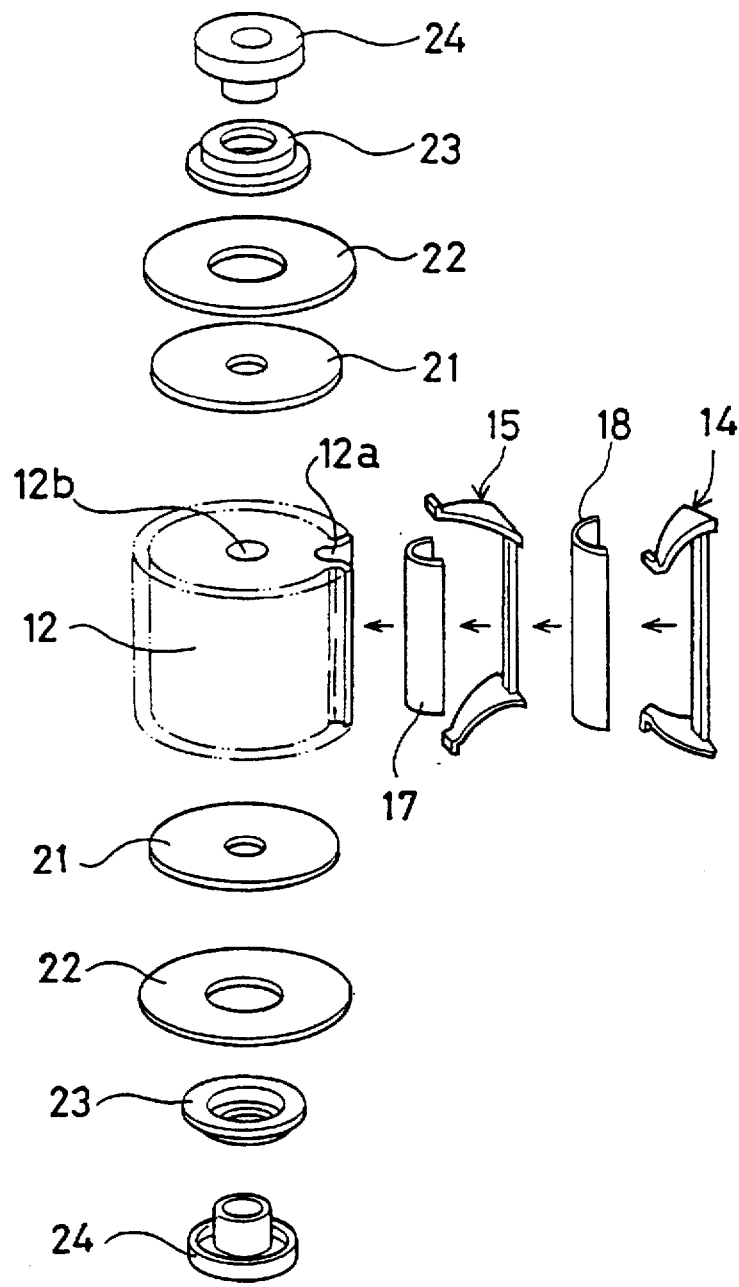
FIG. 5 is an exploded view illustrating an armature core, the coil bars and other parts in the assembling order.

Manufacturing steps of one of the armature coils 13 are described with reference to FIG. 5 because the same manufacturing steps can be applied to all other coils.

Figure 7:
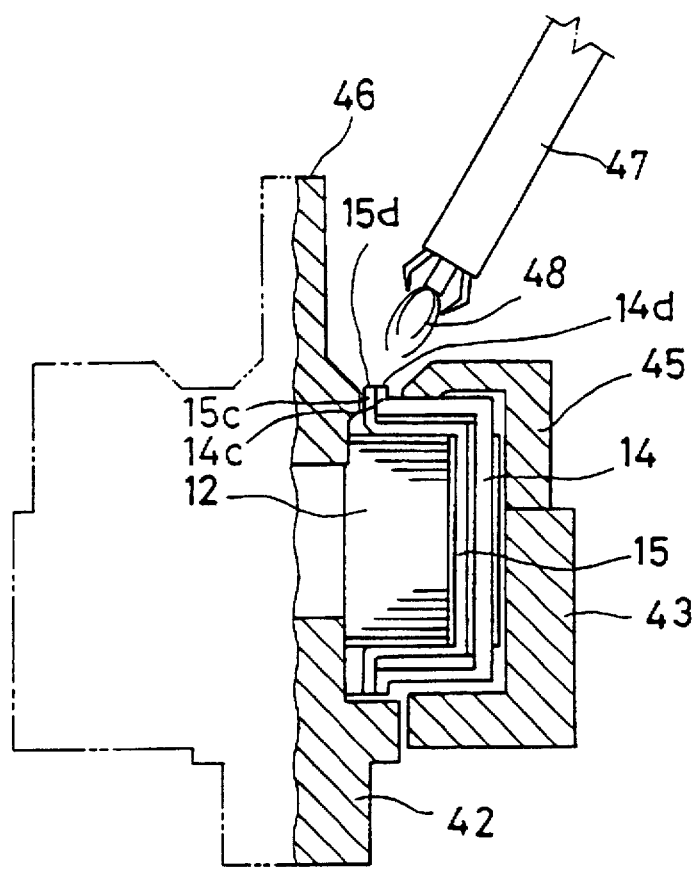
FIG. 7 is a schematic view illustrating welding of the coil bars according to a first embodiment.

Insulating plates 21 are put on opposite ends of the armature core 12 at the beginning, and a slot insulator 17 is inserted into one of the slot 12a. The slot insulator 17 may be replaced with insulating powder coating. Then, the U-shaped lower coil bar 15 is put on the slot insulator 17 in the slot 12a. Then, (after all the lower coil bars are put into the respective slots in the same manner) insulating plates 22 are put on the respective coil-end portions 15b of the lower coil bar 15 which are disposed on opposite ends of the armature core 12, and a slot insulator 18 is inserted into the slot 12a to cover the straight portion 15a of the lower coil bar 15. Then, one of the U-shaped upper coil bars 14 is put on the slot insulator 18 in the slot 12a. Then, the tip portion 14c of the upper coil bar 14 is put on the tip portion 15c of another lower coil bar 15 accommodated in a different slot shifted by a number of slots from the slot accommodating the above upper coil bar as shown in FIG. 7.

Figure 6:
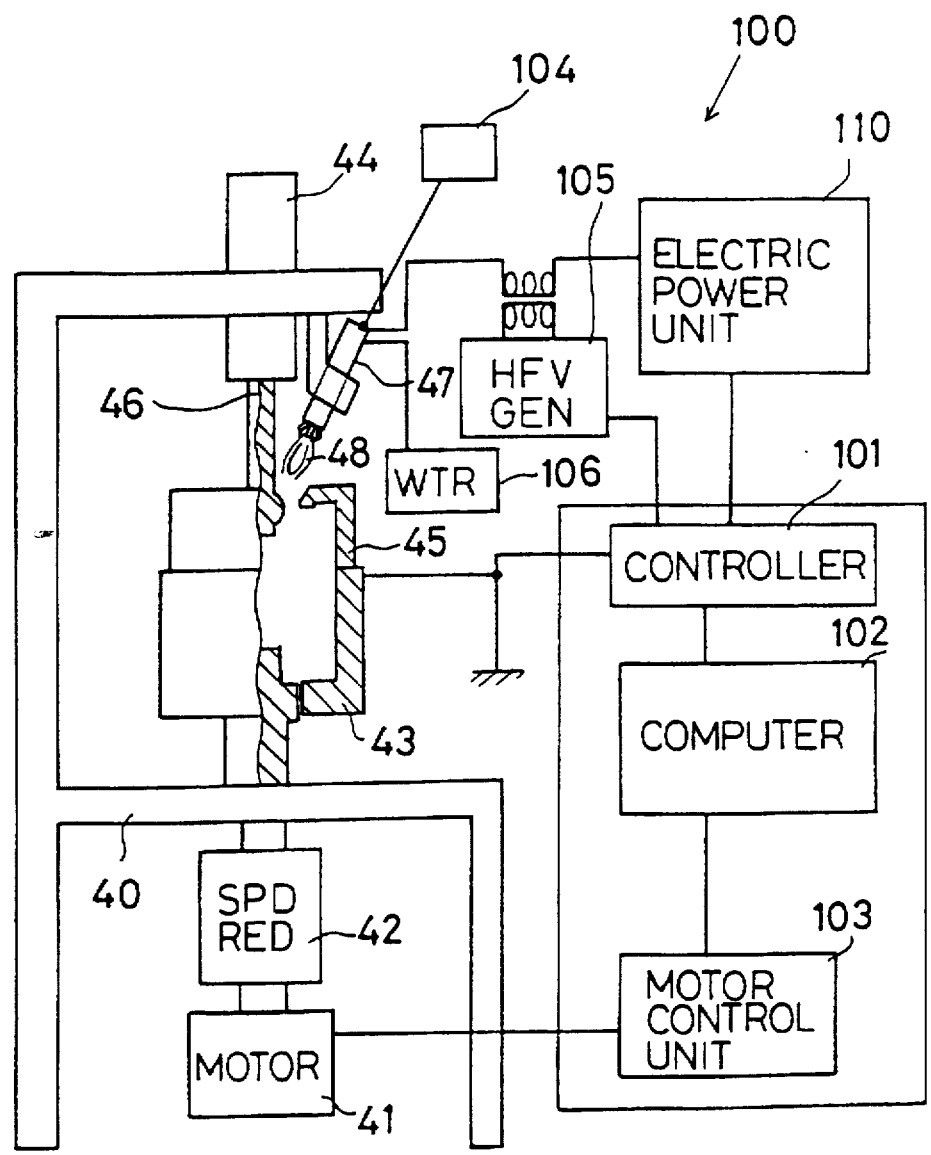
FIG. 6 is a diagrammatic view of a welding system used in a method according to the present invention.

Thus, the respective lower and upper coil bars 14 and 15 are put into all the slots 12a in the same manner as above, and surfaces 14d and 15d of the tip portions 14c and 15c are welded by a TIG (tungsten-inert-gas) welding system 100 shown in FIG. 6.

The welding system 100 is composed of a base frame 40, a motor 41, a speed reduction unit 42, a turn table 43, an upper holder 44, an upper-bar cooling member 45, a lower-bar cooling member 46, a welding torch 47, a welding controller 101, a computer or a sequencer 102, a motor control unit 103, a shield gas supply unit 104, a high-frequency-voltage generator 105, a cooling water supply unit 106 and an electric power unit 110.

The turn table 43 is driven by the motor 41 via the speed reduction unit 42, and holds and turns a work piece such as the armature core 12 which is loaded thereon. The upper holder 44 holds the work piece from above. The upper-bar cooling member 45 covers the surface 14d and 15d of the coil bar's tip portions 14c and 15c and cools portions other than the surfaces 14d and 15d to prevent melting. The lower-bar cooling member 46 is disposed under the tip portions 15c of the lower coil bars 15 to cool portions other than the surface 14d and 15d of the coil bar's tip portions 14c and 15c. The cooling member 46 lifts and expand the tip portions 15c to be in contact with the tip portions 14c of the upper coil bars 14. The welding torch 47 is composed of an electrode made of tungsten, a cooling water passage and a shield gas nozzle, and generates an electric arc 48 to melt and connect the surface 14d and 15d of the upper and lower coil bars 14 and 15.

The welding controller 101 drives the electric torch 47 at controlled on-off timing with controlled power of the electric arc 48. The computer or sequencer 102 controls operation of the welding system 100 including the work loading, turning speed of the work piece and sequence and power control of the electric torch. The motor control unit 103 controls speed and on-off timing of the motor 41. The shield gas supply unit 104 supplies shield gas to welded portions to assure stable welding condition. The high-frequency-voltage generator 105 supplies high-frequency voltage necessary for the welding to the torch 47. The cooling water supply unit 106 circulates cooling water inside the torch 47.

Welding steps carried out by the welding system 100 are described with reference to FIG. 7 hereafter.

An armature core 12 with the upper and lower coil bars 14 and 15 in all the slots 12a is loaded as a work piece on the turn table 43, and the upper-bar and lower-bar cooling members 45 and 46 are brought in contact respectively with portions of the coil-end portions 14b near the tip portions 14c and the tip portions 15c of the lower coil bars 15. Then, the turn table 42, the upper-bar and lower-bar cooling members 45 and 46 are rotated together with the work piece by the motor 41 through the speed reduction unit 42 while the surfaces 14d and 15d of the tip portions 14c and 15c are welded continuously by the TIG welding system 100.

In this case the shaft 11 is not inserted into the armature core 12 and, therefore, sufficient cooling capacity of the lower-bar cooling member 46 can be provided without limit of the shape and size.

Figure 8:
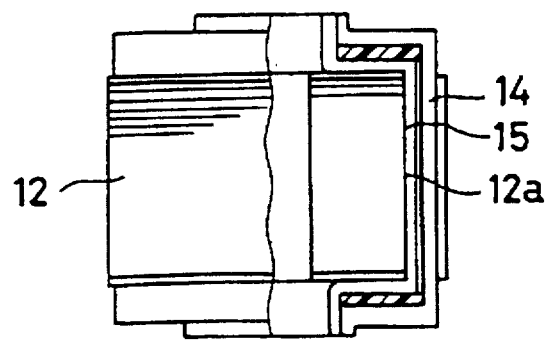
FIG. 8 is a cross-sectional side view illustrating the armature core after welding of the coil bars.

Thereafter the Y-shaped tooth tips 12b are bent as shown by broken lines in FIG. 2 to hold the coil bars 14 and 15 of the armature coil 13. Insulating members 23 and 24 are, then, fixed respectively on the insulating plates 22 if necessary, to form a complete armature core 12 with the armature coil 13 shown in FIG. 8, and the shaft 11 is press-fitted to the center opening of the armature core 12 to finish the rotor 1 shown in FIG. 1.

(Second Embodiment)

Figure 9A:
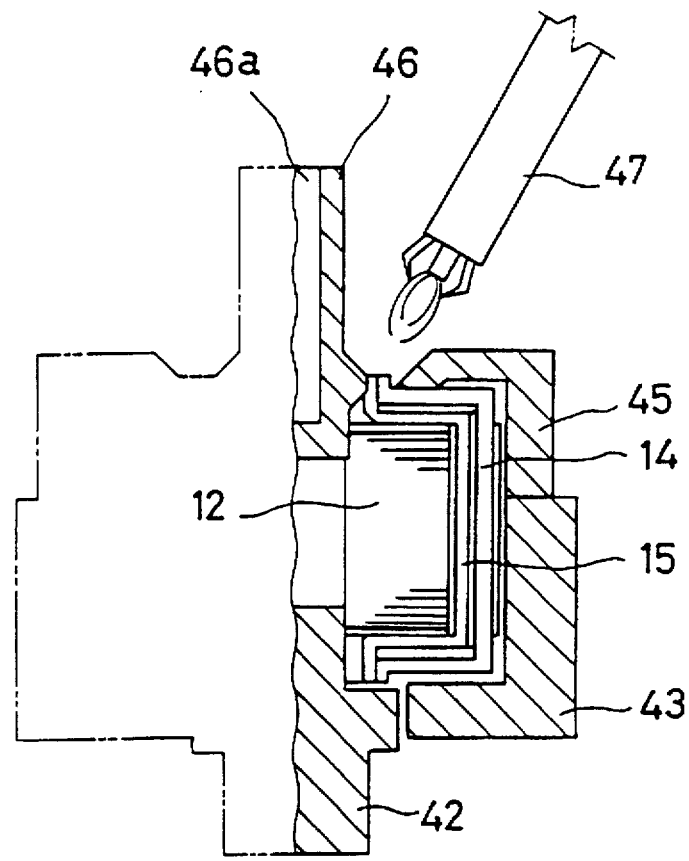
FIGS. 9A, 9B and 9C are schematic views illustrating welding of the coil bars according to a second embodiment.
Figure 9B:
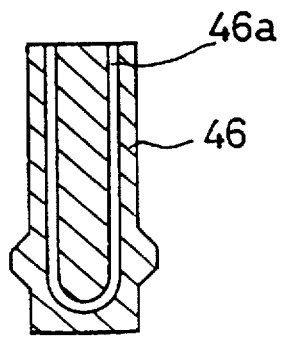
Figure 9C:
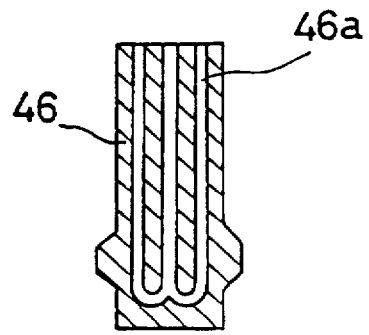

A second embodiment is described with reference to FIGS. 9A, 9B and 9C.

A cooling-water passage 46a is formed in the upper-bar cooling member 46. The cooling-water passage 46a can be formed to provide an inlet and an outlet as shown in FIG. 9B of FIG. 9C.

(Variation)

The upper and lower coil bars 14 and 15 can be inserted into the slots 12a before forming into the U-shape as shown in FIG. 3C. In this case, the coil-end portions 14b and 15b and the tip portions 14c and 15c are bent thereafter.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method of manufacturing a rotary electric machine comprising the steps of:
   providing a cylindrical armature core having a number of slots and a center opening;
   providing lower coil bars each of which has an axially straight portion and coil-end portions radially extending from opposite ends of said straight portion;
   providing upper coil bars each of which has an axially straight portion and coil-end portions radially extending from opposite ends of said straight portion;
   inserting said straight portions of said lower and upper coil bars into respective slots with insulators;
   connecting each tip portion of said coil-end portion of said upper coil bar in each slot to each corresponding tip portion of said coil-end portion of said lower coil bars in a corresponding shifted slot to form a one-turn armature coil said connecting step comprises the steps of:
     pressing inside surfaces of said tip portions of said lower coil bars with a cooling member disposed in said center opening;
     placing a welding torch near a pair of said tip portions of said lower and upper coil bars to be connected;
     grounding said coil bars having said tip portions to be connected;
     welding said tip portions to be connected;
     rotating said armature core by a set angle to place another pair of tip portions to be connected near said torch; and
     repeating said steps of grounding, welding and rotating until all said tip portions are connected;
   cooling said tip portions with said cooling member concurrently with said welding steps;
   removing said cooling member from said center opening; and
   press-fitting a shaft into said center opening of said armature core, after said step of cooling and after said step of removing said cooling member, whereby said shaft occupies occupy a space that was occupied by the cooling member.

2. A method of manufacturing a rotary electric machine as claimed in claim 1, wherein said connecting step comprises steps of:
   rotatably holding inside surfaces of said tip portions of said lower coil bars at a central portion of said armature core by a cooling member;
   placing a welding torch near a pair of said tip portions of said lower and upper coil bars to be connected;
   grounding said coil bars having said tip portions to be connected;
   welding said tip portions to be connected;
   rotating said armature core by a set angle to place another pair of tip portions to be connected near said torch; and
   repeating said steps of grounding, welding and rotating until all said tip portions are connected.

3. A method of manufacturing a rotary electric machine as claimed in claim 2, wherein
   said cooling member maintains cooling temperature by circulating cooling liquid therein.

4. A method of manufacturing a rotary electric machine comprising the steps of:
   stamping out a plurality of thin plates having a number of slots and a center opening;
   forming a cylindrical armature core having a central opening by piling said plurality of thin plates;
   providing lower coil bars each of which has an axially straight portion and coil-end portions radially extending from opposite ends of said straight portion;
   providing upper coil bars each of which has an axially straight portion and coil-end portions radially extending from opposite ends of said straight portion;
   inserting said straight portions of said lower and upper coil bars into respective slots with insulators;
   electrically welding each tip portion of said coil-end portion of said upper coil bar in each slot to each corresponding tip portion of said coil-end portion of said lower coil bars in a corresponding shifted slot to form a one-turn armature coil;
   pressing portions of said tip portions to a water cooling member inserted in said central opening concurrently with said step of welding;
   removing said water cooling member from said central opening; and
   press-fitting a shaft into said central opening of said armature core after said step of cooling and after said step of removing said cooling member, whereby said shaft occupies occupy a space that was occupied by the water cooling member;
   wherein said welding step comprises the steps of:
     placing a welding torch near a pair of said tip portions of said lower and upper coil bars to be connected;
     grounding said coil bars having said tip portions to be connected;
     welding said tip portions to be connected;
     rotating said armature core by a set angle to place another pair of tip portions to be connected near said torch; and
     repeating said steps of grounding, welding and rotating until all said tip portions are welded.

5. A method of manufacturing a rotary electric machine comprising the steps of:
   providing a cylindrical armature core having a number of slots, Y-shaped tooth tips between said slots and a center opening, lower coil bars each of which is disposed in said slots respectively and has an axially straight portion and coil-end portions radially extending from opposite ends of said straight portion and upper coil bars each of which is disposed in said slots on each of said lower coil bars respectively via insulators and has an axially straight portion and coil-end portions radially extending from opposite ends of said straight portion;
   bending said Y-shaped tooth tips to hold said straight portions of said lower and upper coil bars in said slots, respectively;
   placing a water cooling member at a central portion of said armature core, in said center opening;
   pressing inside surfaces of tip portions of said coil end portions of said lower coil bars to said water cooling member;

placing a welding torch near a pair of said tip portions of said lower and upper coil bars to be connected;

grounding said coil bars having said tip portions to be connected;

welding said tip portions to be connected;

rotating said armature core by a set angle to place another pair of tip portions to be connected near said torch;

repeating said steps of grounding, welding and rotating until all said tip portions are connected; and removing said water cooling member from said center opening; and press-fitting a shaft into said center opening of said armature core after said step of cooling and after said step of removing said water cooling member, whereby said shaft occupies occupy a space that was occupied by the water cooling member.

6. A method of manufacturing a rotary electric machine as in claim 1, wherein said inside surfaces of said tip portions of said lower coil bars pressed with said cooling member are remote from the portions thereof to be connected by welding.

7. A method of manufacturing a rotary electric machine as in claim 4, wherein said portions of said tip portions pressed to said water cooling member are portions other than portions thereof to be connected by welding.

8. A method of manufacturing a rotary electric machine as in claim 5, wherein said inside surfaces of said tip portions of said coil end portions pressed to said water cooling member are portions other than connecting portions thereof to be connected by welding.

* * * * *